(12) United States Patent
Jiang et al.

(10) Patent No.: US 7,156,280 B1
(45) Date of Patent: Jan. 2, 2007

(54) BRAZE ALLOY COMPOSITIONS

(75) Inventors: Liang Jiang, Schenectady, NY (US); Laurent Cretegny, Niskayuna, NY (US); Warren M. Miglietti, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/300,394

(22) Filed: Dec. 15, 2005

(51) Int. Cl.
*B23K 35/14* (2006.01)
*C22F 1/10* (2006.01)
*B32B 15/00* (2006.01)

(52) U.S. Cl. ............... 228/56.3; 148/562; 428/668
(58) Field of Classification Search ............ None
See application file for complete search history.

(56) References Cited

U.S. PATENT DOCUMENTS

| | | | |
|---|---|---|---|
| 3,817,719 A * | 6/1974 | Schilke et al. ........... 75/231 |
| 4,414,178 A | 11/1983 | Smith et al. | |
| 5,240,491 A | 8/1993 | Budinger et al. | |
| 5,735,448 A | 4/1998 | Draghi et al. | |
| 5,783,318 A * | 7/1998 | Biondo et al. ........... 428/680 |
| 6,165,290 A | 12/2000 | Rabinkin | |
| 6,365,285 B1 * | 4/2002 | Chesnes ................ 428/668 |
| 6,503,349 B1 * | 1/2003 | Pietruska et al. ........ 148/562 |
| 6,520,401 B1 | 2/2003 | Miglietti | |
| 6,530,971 B1 | 3/2003 | Cohen et al. | |
| 2003/0002988 A1 * | 1/2003 | Jackson et al. ......... 416/241 R |
| 2004/0184945 A1 * | 9/2004 | Sjodin .................. 420/42 |
| 2005/0067061 A1 | 3/2005 | Huang et al. | |
| 2006/0068214 A1 * | 3/2006 | Gigliotti et al. ........ 428/527 |

\* cited by examiner

*Primary Examiner*—Lynne R. Edmondson
(74) *Attorney, Agent, or Firm*—Nixon & Vanderhye P.C.

(57) ABSTRACT

A nickel-based high-temperature braze alloy composition includes Cr, Hf, and B. Furthermore, a cobalt-based high-temperature braze alloy composition includes Cr, Hf, and B. The braze alloys can be used, for example, as a single homogenous braze. The braze alloys can also be used, for example, as a component in a wide gap braze mixture where higher or lower melting point superalloy and/or brazing powder is used. The braze alloys may permit joining/repairing of superalloy articles with complex shape and may be used in high temperature applications.

20 Claims, 2 Drawing Sheets

Ni – 13Cr – 15Hf

Ni – 13Cr – 15Hf – 1B

Ni – 13Cr – 20Hf

Ni – 13Cr – 25Hf

BRAZE ALLOY COMPOSITIONS

BACKGROUND OF THE INVENTION

This invention generally relates to braze alloy compositions. More specifically, the invention relates to nickel-based and cobalt-based braze alloy compositions.

In order to function effectively in a high-temperature environment, heavy alloy components are typically added to strengthen a superalloy. This may result in difficulties for welding joining/repair of superalloy components used in an extreme environment, such as a hot-gas-path airfoil in a gas turbine. Brazing is becoming a more preferred choice for joining/repair of superalloy components as a result of its reduced cost and cycle time. However, it can be challenging to make the braze joints/repair to have certain properties—especially ductility—approaching that of the superalloy substrate material. Generally, a primary obstacle can be the formation of brittle phases in the brazed joint.

Boron has been used extensively in brazing alloys, but brittle borides typically result in poor mechanical properties of the braze joint. A process to improve the mechanical integrity of the braze joint/repaired area generally requires the use of a prolonged diffusion cycle. This approach may reduce the amount of brittle boride phases by homogenization with substrate superalloys or braze powder mixture. This process, however, may require a prolonged cycle time, increasing cost and subjecting the substrate superalloy to thermal degradation.

Braze alloy compositions—and related processes and articles—are described in U.S. Pat. No. 4,414,178 to Smith et al.; U.S. Pat. No. 5,240,491 to Budinger at al.; U.S. Pat. No. 5,735,448 to Draghi et al.; U.S. Pat. No. 5,783,318 to Biondo et al.; U.S. Pat. No. 6,503,349 to Pietruska et al.; U.S. Pat. No. 6,520,401 to Miglietti; U.S. Pat. No. 6,530,971 to Cohen et al.; U.S. Pat. No. 6,165,290 to Rabinkin; and U.S. Patent App. Pub. No. 20050067061 to Huang et al. Where hafnium is present in a low-weight percentage, it generally acts as a grain boundary strengthener—not as a reducer of the braze alloy composition's melting point.

BRIEF DESCRIPTION OF THE INVENTION

There are generally two exemplary embodiments of braze alloy compositions within the scope of the present invention. One exemplary embodiment relates to a nickel-based high-temperature braze alloy composition comprising chromium (Cr), hafnium (Hf), and boron (B). Another exemplary embodiment relates to a cobalt-based high-temperature braze alloy composition comprising Cr, Hf, and B.

In one embodiment, a nickel-based braze alloy composition comprises: 9–25% chromium by weight, and all subranges therebetween; 5–45% hafnium by weight, and all subranges therebetween; and 0.05–6% boron by weight, and all subranges therebetween.

In another embodiment, a cobalt-based braze alloy composition comprises: 9–25% chromium by weight, and all subranges therebetween; 5–56% hafnium by weight, and all subranges therebetween; and 0.05–6% boron by weight, and all subranges therebetween.

DETAILED DESCRIPTION OF THE INVENTION

Figure 1:
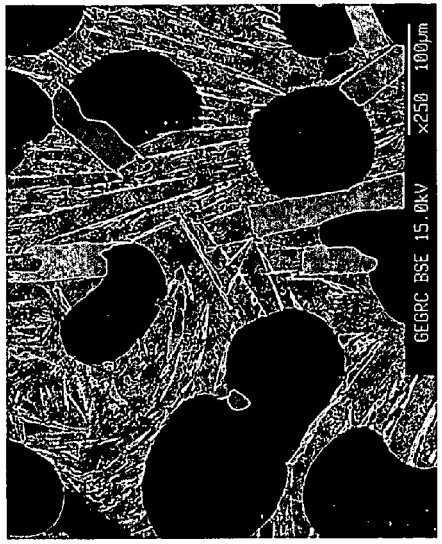
FIG. 1 illustrates typical microstructures for nickel-based braze alloys.
Figure 1:
Figure 1:
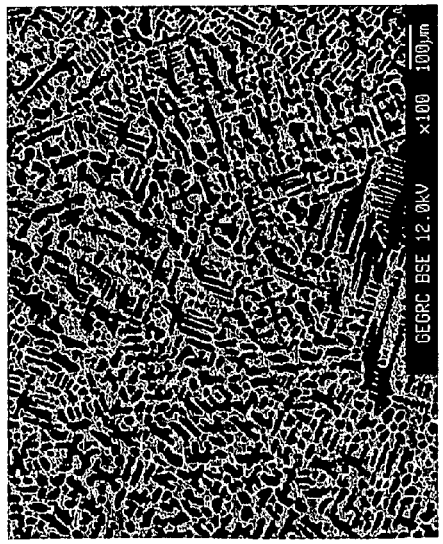
Figure 1:

The braze alloy composition may be used as a single homogenous braze. Alternatively, the braze alloy composition may be used as a component in, for example, a wide-gap braze mixture where higher or lower melting point superalloy and/or braze powder is used. These braze alloy compositions may permit, for example, joining or repairing of superalloy articles with complex shapes and high temperature applications. Furthermore, the braze alloy compositions may provide for enhanced ductility.

In general terms, the boron and hafnium are coupled to suppress the solidus temperature, and the chromium, hafnium, and boron are coupled to suppress the liquidus temperature. In addition, the added chromium may provide, for example, oxidation and corrosion resistance of the brazing alloy. A boron-, chromium-, and hafnium-containing intermetallic compound may be more ductile than chromium-, tungsten-, and nickel-containing borides.

The braze alloy compositions disclosed and claimed herein may permit brazing at high temperatures without degrading the superalloy substrate, may reduce the brittleness of the borides or intermetallic compounds formed during the brazing process, and may improve the mechanical properties (including, for example, ductility) of the braze joint.

In accordance with one exemplary embodiment of the invention, a nickel-based braze alloy composition comprises: 9–25% chromium by weight, and all subranges therebetween; 5–45% hafnium by weight, and all subranges therebetween; and 0.05–6% boron by weight, and all subranges therebetween.

In accordance with one exemplary embodiment of the invention, the chromium is preferably 9–15% by weight. More preferably, the chromium is 13% by weight. Preferably, the hafnium is 10–30% by weight. More preferably, the hafnium is 15–25% by weight. Even more preferably, the hafnium is 15%, 20%, or 25% by weight. Preferably, the boron is 0.05–3.6% by weight. More preferably, the boron is 1% by weight.

In accordance with another exemplary embodiment of the invention, a portion of the residual nickel in the nickel-based braze alloy composition is substituted with at least one element commonly found in superalloys, such as, for example, aluminum, titanium, molybdenum, tungsten, cobalt, iron, zirconium, niobium, rhenium, carbon, and silicon. Preferably, up to 60% of the residual nickel is substituted with at least one element commonly found in superalloys. More preferably, up to 50% of the residual nickel is substituted with at least one element commonly found in superalloys.

In accordance with another exemplary embodiment of the invention, the nickel-based braze alloy composition has a solidus temperature less than 2175° F. More preferably, the nickel-based braze alloy composition has a solidus temperature less than 2100° F. Even more preferably, the nickel-based alloy composition has a solidus temperature less than 2025° F.

In accordance with another exemplary embodiment of the invention, the nickel-based braze alloy composition consists essentially of 9–25% chromium by weight; 5–45% hafnium by weight; 0.05–6% boron by weight; and nickel. More preferably, the nickel-based braze alloy composition consists essentially of 9–25% chromium by weight; 10–30% hafnium by weight; 0.05–3.6% boron by weight; and nickel.

In accordance with another exemplary embodiment of the invention, a cobalt-based braze alloy composition comprises: 9–25% chromium by weight, and all subranges therebetween; 5–56% hafnium by weight, and all subranges therebetween; and 0.05–6% boron by weight, and all subranges therebetween.

In accordance with another exemplary embodiment of the invention, the chromium is 15–25% by weight. More preferably, the chromium is 20% by weight. Preferably, the hafnium is 10–30% by weight. More preferably, the hafnium is 10–26% by weight. Even more preferably, the hafnium is 15%, 20%, or 25% by weight. Preferably, the boron is 0.05–4% by weight. More preferably, the boron is 1% by weight.

In accordance with another exemplary embodiment of the invention, the cobalt-based braze alloy composition has a solidus temperature less than 2175° F. More preferably, the cobalt-based braze alloy composition has a solidus temperature less than 2100° F. Even more preferably, the cobalt-based alloy composition has a solidus temperature less than 2025° F.

In accordance with another exemplary embodiment of the invention, the cobalt-based braze alloy composition consists essentially of 9–25% chromium by weight; 5–56% hafnium by weight; and 0.05–6% boron by weight; and cobalt. More preferably, the cobalt-based braze alloy composition consists essentially of 9–25% chromium by weight; 10–26% hafnium by weight; 0.05–4% boron by weight; and cobalt.

In accordance with another exemplary embodiment of the invention, a portion of the residual cobalt in the cobalt-based braze alloy composition is substituted with at least one element commonly found in superalloys, such as, for example, aluminum, titanium, molybdenum, tungsten, nickel, iron, zirconium, niobium, rhenium, carbon, and silicon. Preferably, up to 60% of the residual cobalt is substituted with at least one element commonly found in superalloys. More preferably, up to 50% of the residual cobalt is substituted with at least one element commonly found in superalloys.

A person of ordinary skill in the art should understand and recognize that all disclosed and claimed percentages are approximate.

Figure 2:
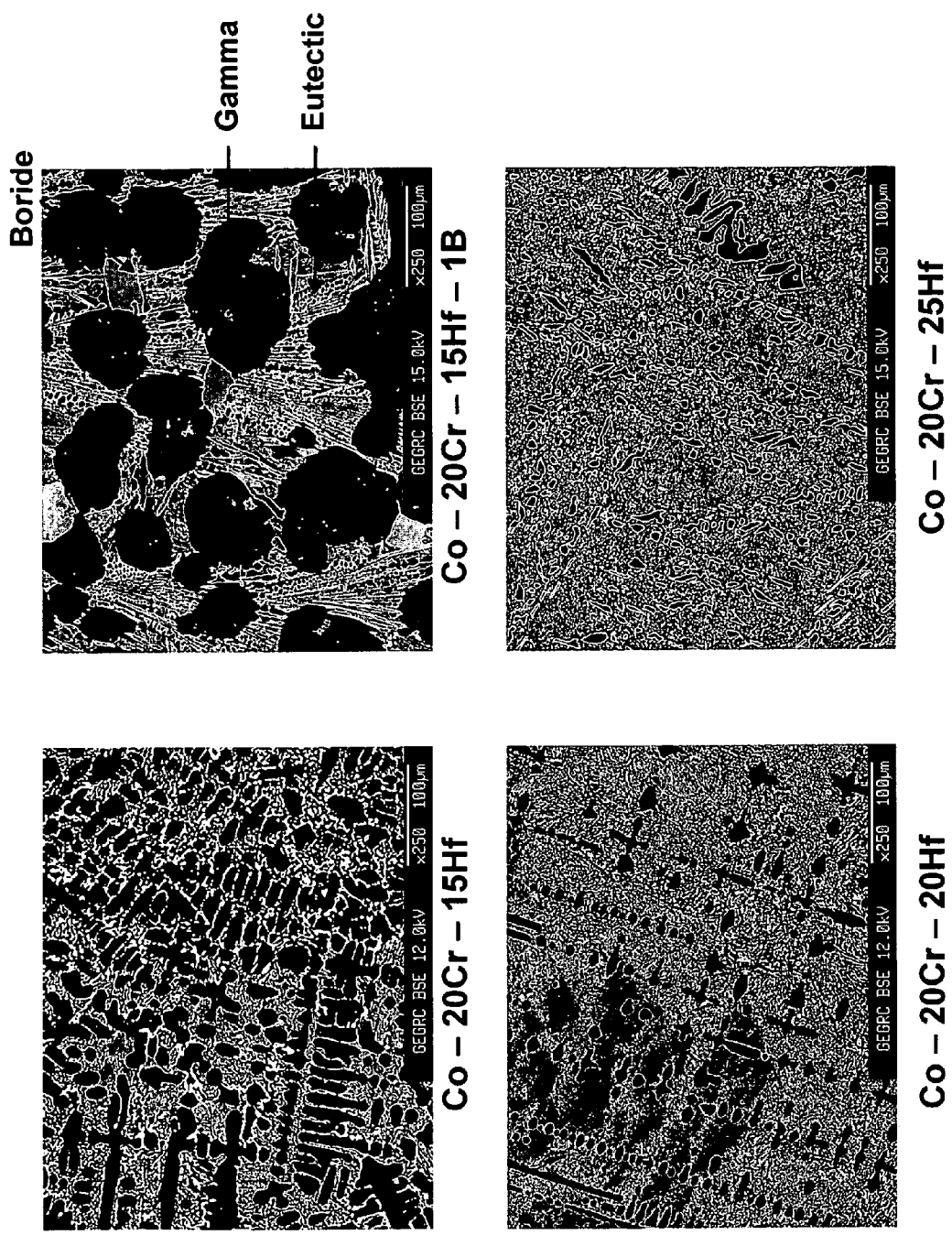
FIG. 2 illustrates typical microstructures for cobalt-based braze alloys.

FIG. 1 depicts four nickel-based braze alloy compositions. FIG. 2 depicts four cobalt-based braze alloy compositions.

The following table (Table 1) shows hardness measurements for different phases in certain braze alloy compositions:

TABLE 1

Micro-Hardness Results of Hafnium-Containing Braze Alloys

| | Micro Hardness (HV) | | | | | |
| --- | --- | --- | --- | --- | --- | --- |
| | Gamma | | Eutectic | | Boride | |
| Braze Alloy | Ave. | Std. Dev. | Ave. | Std. Dev. | Ave. | Std. Dev. |
| Ni-13Cr-15Hf-1B | 215 | 17 | 576 | 76 | N/A | N/A |
| Ni-13Cr-15Hf | 242 | 19 | 294 | 56 | / | / |
| Ni-13Cr-20Hf | 309 | 19 | 322 | 72 | / | / |
| Ni-13Cr-25Hf | 398 | 32 | 324 | 30 | / | / |
| Ni-13Cr-25Hf-1B | 326 | 93 | 746 | 108 | 1150 | 240 |
| Co-20Cr-15Hf-1B | 433 | 18 | 917 | 53 | 1229 | 84 |
| Co-20Cr-15Hf | 477 | 46 | 658 | 89 | / | / |
| Co-20Cr-20Hf | 565 | 21 | 612 | 61 | / | / |
| Co-20Cr-25Hf | / | / | 1104 | 197 | / | / |
| Co-20Cr-25Hf-1B | 538 | 59 | | | N/A | N/A |

Table 1 exemplifies that boride is typically harder than a hafnium-bearing compound.

The following table (Table 2) shows melting point temperature measurements of certain braze alloy compositions:

TABLE 2

DSC Results of Hafnium-Containing Braze Alloys

| Braze Alloy | Solidus (° F.) | Liquidus (° F.) |
| --- | --- | --- |
| Ni—13Cr—15Hf—1B | 2013 | 2352 |
| Ni—13Cr—15Hf | 2201 | 2438 |
| Ni—13Cr—20Hf | 2228 | 2380 |
| Ni—13Cr—25Hf | 2248 | 2355 |
| Ni—13Cr—25Hf—1B | 2010 | 2322 |
| Co—20Cr—15Hf—1B | 2008 | 2340 |
| Co—20Cr—15Hf | 2286 | 2493 |
| Co—20Cr—20Hf | 2324 | 2381 |
| Co—20Cr—25Hf | 2307 | 2408 |
| Co—20Cr—25Hf—1B | 2012 | 2205 |

The temperatures in Table 2 are based on differential scanning calorimetry (DSC) heating curve analysis. Table 2 exemplifies that hafnium-containing braze alloys with boron may have beneficial properties.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nickel-based braze alloy composition comprising:
   9–25% chromium by weight;
   10–45% hafnium by weight; and
   0.05–6% boron by weight.

2. The nickel-based braze alloy composition of claim 1 comprising:
   9–25% chromium by weight;
   10–30% hafnium by weight; and
   0.05–3.6% boron by weight.

3. The nickel-based braze alloy composition of claim 1 comprising 9–15% chromium by weight.

4. The nickel-based braze alloy composition of claim 1 comprising 10–30% hafnium by weight.

5. The nickel-based braze alloy composition of claim 1 comprising 0.05–3.6% boron by weight.

6. The nickel-based braze alloy composition of claim 1, wherein up to 60% of a residual nickel content is substituted by at least one element selected from the group consisting of aluminum, titanium, molybdenum, tungsten, cobalt, iron, zirconium, niobium, rhenium, carbon, and silicon.

7. The nickel-based braze alloy composition of claim 1, wherein up to 50% of a residual nickel content is substituted by at least one element selected from the group consisting of aluminum, titanium, molybdenum, tungsten, cobalt, iron, zirconium, niobium, rhenium, carbon, and silicon.

8. The nickel-based braze alloy composition of claim 1, wherein the nickel-based braze alloy composition is a component in a wide-gap braze mixture or is a single homogenous braze.

9. The nickel-based braze alloy composition of claim 1, wherein the nickel-based braze alloy composition has a solidus temperature less than 2025° F.

10. A nickel-based braze alloy composition consisting of:
9–25% chromium by weight;
5–45% hafnium by weight;
0.05–6% boron by weight; and
nickel.

11. A cobalt-based braze alloy composition comprising:
9–25% chromium by weight;
10–56% hafnium by weight; and
0.05–6% boron by weight.

12. The cobalt-based braze alloy composition of claim 11 comprising:
9–25% chromium by weight;
10–26% hafnium by weight; and
0.05–4% boron by weight.

13. The cobalt-based braze alloy composition of claim 11 comprising 15–25% chromium by weight.

14. The cobalt-based braze alloy composition of claim 11 comprising 10–26% hafnium by weight.

15. The cobalt-based braze alloy composition of claim 11 comprising 0.05–4% boron by weight.

16. The cobalt-based braze alloy composition of claim 11, wherein up to 60% of a residual nickel content is substituted by at least one element selected from the group consisting of aluminum, titanium, molybdenum, tungsten, nickel, iron, zirconium, niobium, rhenium, carbon, and silicon.

17. The cobalt-based braze alloy composition of claim 11, wherein up to 50% of a residual nickel content is substituted by at least one element selected from the group consisting of aluminum, titanium, molybdenum, tungsten, nickel, iron, zirconium, niobium, rhenium, carbon, and silicon.

18. The cobalt-based braze alloy composition of claim 11, wherein the cobalt-based braze alloy composition is a component in a wide-gap braze mixture or is a single homogenous braze.

19. The cobalt-based braze alloy composition of claim 11, wherein the cobalt-based braze alloy composition has a solidus temperature less than 2025° F.

20. A cobalt-based braze alloy composition consisting of:
9–25% chromium by weight;
5–56% hafnium by weight;
0.05–6% boron by weight; and
cobalt.

* * * * *